United States Patent
Sato

(10) Patent No.: US 7,272,661 B2
(45) Date of Patent: Sep. 18, 2007

(54) DISK DEVICE AND DISK ACCESS ROUTE MAPPING

(75) Inventor: Eiichi Sato, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 743 days.

(21) Appl. No.: 10/231,527

(22) Filed: Aug. 29, 2002

(65) Prior Publication Data
US 2003/0158966 A1    Aug. 21, 2003

(30) Foreign Application Priority Data
Feb. 19, 2002   (JP) .............................. 2002-041647

(51) Int. Cl.
*G06F 13/00*   (2006.01)
(52) U.S. Cl. ..................................... 709/242; 709/229
(58) Field of Classification Search ........ 709/220–223, 709/238, 239, 242, 226, 229; 717/171–173
See application file for complete search history.

(56) References Cited

U.S. PATENT DOCUMENTS

| | | | | |
|---|---|---|---|---|
| 6,622,220 B2 * | 9/2003 | Yoshida et al. | ............. | 711/152 |
| 6,647,387 B1 * | 11/2003 | McKean et al. | ................ | 707/9 |
| 6,947,939 B2 * | 9/2005 | Fujibayashi et al. | ........... | 707/10 |
| 2002/0103943 A1 * | 8/2002 | Lo et al. | ......................... | 710/2 |
| 2003/0131108 A1 * | 7/2003 | Kagami et al. | ............. | 709/226 |
| 2003/0131192 A1 * | 7/2003 | Nakamura et al. | .......... | 711/114 |
| 2003/0140128 A1 * | 7/2003 | Cox et al. | .................... | 709/221 |
| 2003/0208589 A1 * | 11/2003 | Yamamoto | .................. | 709/224 |
| 2004/0098417 A1 * | 5/2004 | Nishikawa et al. | ......... | 707/201 |
| 2005/0050191 A1 * | 3/2005 | Hubis | ......................... | 709/223 |

* cited by examiner

*Primary Examiner*—Kenneth R. Coulter
(74) *Attorney, Agent, or Firm*—Townsend and Townsend and Crew LLP

(57) ABSTRACT

In a storage area network system in which storage subsystems each containing disk devices are connected to servers through fiber channels and fiber channel switches, one of disk devices in each of the storage subsystems is used as either a storage control master device or a storage control replica device in which group setting information concerning classification of disk devices into a storage management group and a storage access definition group or storage access definition groups is stored. When a server starts, the server is made to selectively recognize the storage control master device or the storage control replica device, to read the group setting information from the recognized storage control device, and further to recognize only disk devices belonging to a group in association with the server.

8 Claims, 6 Drawing Sheets

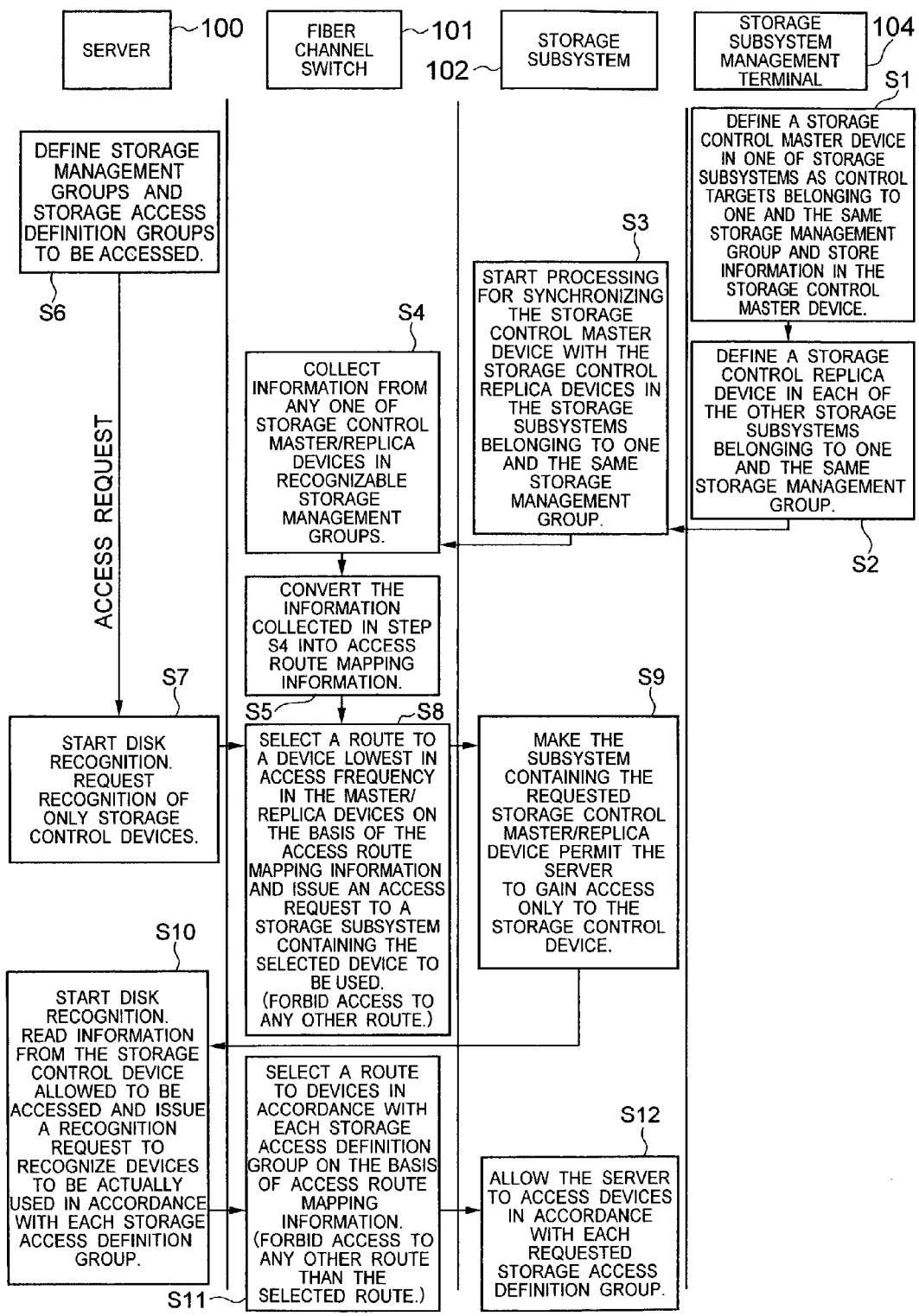

FIG. 3

INFORMATION FORMAT FOR DEFINING STORAGE CONTROL MASTER AND REPLICA DEVICES

<DEVICE MAPPING TABLE> 300

| STORAGE MANAGEMENT GROUP | STORAGE ACCESS DEFINITION GROUP | STORAGE SUBSYSTEM ID | CONNECTION PORT WWN OF SUBSYSTEM | TARGET LU NUMBER |
|---|---|---|---|---|
| group01 | database | 001 | xxxxxxxxxxxxxxxx | 01,02,03 |
| group01 | database | 002 | yyyyyyyyyyyyyyyy | 01,02 |
| group01 | imagedata | 003 | zzzzzzzzzzzzzzzz | 01 |

<SERVER SECURITY TABLE> 400

| STORAGE MANAGEMENT GROUP | STORAGE ACCESS DEFINITION GROUP | ACCESS ALLOWED SERVER | CONNECTION PORT WWN OF SERVER |
|---|---|---|---|
| group01 | database | server1, server2 | aaaaaaaaaaaa, bbbbbbbbbbbb |
| group01 | imagedata | server2 | bbbbbbbbbbbb |

WWN MEANS A UNIQUE ADDRESS ASSIGNED TO EVERY PORT WHEN CONNECTION THROUGH FIBER CHANNEL IS EXECUTED (AN ABBREVIATION OF WORLD WIDE NAME).

FIG. 4

ROUTE MAPPING INFORMATION FORMAT CONVERTED BY FIBER CHANNEL SWITCH

500

501 <STORAGE CONTROL DEVICE>

| STORAGE MANAGEMENT GROUP | STORAGE CONTROL DEVICE | STORAGE SUBSYSTEM ID | CONNECTION PORT WWN | LU NUMBER | ACCESS FREQUENCY |
|---|---|---|---|---|---|
| group01 | MASTER DEVICE | 001 | xxxxxxxxxxxxxxxx | 04 | 10 |
| group01 | REPLICA DEVICE-1 | 002 | yyyyyyyyyyyyyyyy | 03 | 2 |
| group01 | REPLICA DEVICE-2 | 003 | zzzzzzzzzzzzzzzz | 02 | 5 |
| group02 | MASTER DEVICE | 010 | kkkkkkkkkkkkkkkk | 01 | 5 |

502 503 504 505 506

600

601 <ACCESS ROUTE MAPPING TABLE>

| SERVER | SERVER CONNECTION PORT WWN | STORAGE SUBSYSTEM ID | SUBSYSTEM CONNECTION PORT WWN | STORAGE MANAGEMENT GROUP | STORAGE ACCESS DEFINITION GROUP | VIA ANOTHER SWITCH |
|---|---|---|---|---|---|---|
| server1 | aaaaaaaaaaaaaaaa | 001 | xxxxxxxxxxxxxxxx | group01 | database | (None) |
|  |  | 002 | yyyyyyyyyyyyyyyy | group01 | database | switch2 |
| server2 | bbbbbbbbbbbbbbbb | 001 | xxxxxxxxxxxxxxxx | group01 | database | (None) |
|  |  | 002 | yyyyyyyyyyyyyyyy | group01 | database | (None) |
|  |  | 003 | zzzzzzzzzzzzzzzz | group01 | imagedata | Switch3 |
| server10 | cccccccccccccccc | 010 | kkkkkkkkkkkkkkkk | group02 | documents | (None) |

602 603 604 605 606 607

WWN MEANS A UNIQUE ADDRESS ASSIGNED TO EVERY PORT WHEN CONNECTION THROUGH FIBER CHANNEL IS EXECUTED (AN ABBREVIATION OF WORLD WIDE NAME).

DISK DEVICE AND DISK ACCESS ROUTE MAPPING

BACKGROUND OF THE INVENTION

The present invention relates to a storage technique, particularly to management and control of storage devices in a computer system and more specifically to an effective technique applied to a storage area network system including storage device-containing storage subsystems, fiber channel switches, and servers.

Increase in scale and capacity of data storage devices for various kinds of databases or WEB servers has been advanced with the development of information-oriented society such as popularization of the Internet. The concept "storage area network system" is known as a configuration used in place of a conventional configuration in which private storage subsystems are connected to one host so as to be subordinate to the host. In the storage area network system, a plurality of storage subsystems are connected to one another through a private information network to thereby logically construct one huge storage device in a state in which a plurality of hosts externally connected to the storage area network system need not be conscious of the storage subsystems individually.

In a system having such a storage area network environment constructed to have a large number of disk devices (logical units, logical volumes, and so on), a server needs to recognize necessary disk devices present in the storage area network environment when the server starts or when the server executes a disk device recognition process. The server, however, tries to recognize all accessible disk devices regardless of whether or not the server actually uses the disk devices.

In the system having a storage area network environment in which a large number of disk devices are present, when a server starts or when a server executes a disk device recognition process, a large amount of time may be required for the server's start or recognition of disk devices because the server also has to recognize disk devices not intended to be used by the server. Moreover, because the number of disk devices that can be recognized by the server is limited in accordance with the capacity and performance of the server or of an operating system of the server, the server may become inoperative when the number of the all disk devices exceeds the limit.

SUMMARY OF THE INVENTION

An object of the present invention is to achieve reduction in time for server's recognition of disk devices and avoidance of an error such as failure in starting caused by recognition of unnecessary disk devices in a storage area network system.

Another object of the invention is to provide a switch and an information processing system, in which when connection of a disk subsystem in a storage area network system is changed, a change of a route to a changed disk storage can be achieved without interruption of any access operation in the system.

A further object of the invention is to provide an access control method in a storage area network system having a plurality of storage subsystems each containing a plurality of storage devices, and an information network for connecting the storage subsystems to one another, the access control method having the steps of: storing management information in one of storage devices in each of the storage subsystems, the management information being used for setting a range of recognition of accessible storage devices and access route mapping for the accessible storage devices in the storage area network system; and controlling the range of recognition of accessible storage devices on the basis of the management information read from the storage device.

More specifically, in a system having a storage area network environment in which a large number of disk devices are present in each of storage subsystems connected to one another through an information network, disk devices and access route mapping used by each of servers are unitarily managed as management information common to the storage subsystems, the disk devices, fiber channel switches and the servers by a part (specific dedicated disk device) of each of the storage subsystems. When the respective devices in the system acquire the management information and use it as control information, each of the servers can access necessary disk devices efficiently.

BRIEF DESCRIPTION OF THE DRAWINGS

FIG. 2 is a flow chart showing an example of operation of the control method in the storage area network system according to the embodiment of the invention;

FIG. 3 is a conceptual view showing an example of a management information format used in the control method in the storage area network system according to the embodiment of the invention;

FIG. 4 is a conceptual view showing an example of an access route mapping information format converted by a fiber channel switch constituting the storage area network system according to the embodiment of the invention;

DETAILED DESCRIPTION OF THE EMBODIMENTS

An embodiment of the present invention will be described in detail below with reference to the drawings.

Figure 1:
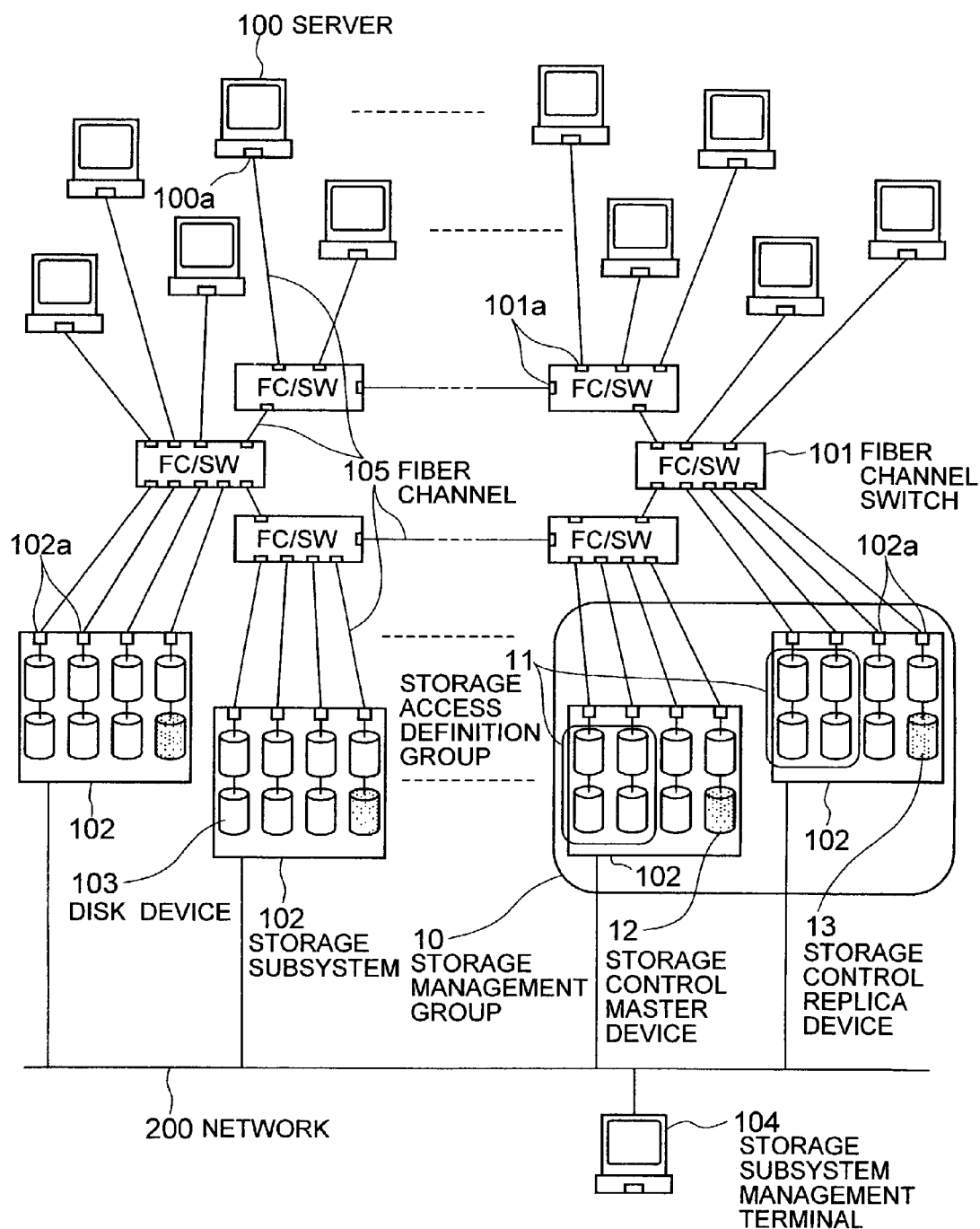
FIG. 1 is a conceptual view showing an example of the configuration of an information processing system including a storage area network system in which a control method according to an embodiment of the present invention is carried out.

FIG. 1 is a conceptual view showing an example of the configuration of an information processing system including a storage area network system in which a control method according to an embodiment of the present invention is carried out.

The information processing system according to this embodiment is constituted by a storage area network system, and a large number of servers 100. The storage area network system includes a large number of fiber channel switches 101, and a large number of storage systems or storage subsystems 102. Each of the storage subsystems 102 has a large number (e.g. several thousands or more) of disk devices 103 such as physical volumes, physical disk devices, logical volumes or logical disk devices (LU). The servers 100 are connected to the storage area network system through the fiber channel switches 101.

The servers 100 are connected to the fiber channel switches 101 by fiber channels 105. The fiber channel switches 101 are connected to one another by fiber channels 105. The fiber channel switches 101 are connected to the storage subsystems 102 by fiber channels 105. In this manner, the fiber channels 105 construct a network.

Further, the respective storage subsystems 102 and the fiber channel switches 101 are connected to a storage subsystem management terminal 104 through another network 200 such as an LAN than the network constructed by the fiber channels 105. Maintenance management such as setting of various kinds of information which will be described later is carried out by the storage subsystem management terminal 104 through the network 200.

Disk devices 103 used are allocated to connection ports 102a which are provided in the storage subsystems 102 so as to be connected to fiber channels 105. In this manner, each of the servers 100 can access disk devices 103 allocated to the connection ports 102a of the storage subsystems 102 through corresponding fiber channels 105 and fiber channel switches 101.

On this occasion, in this embodiment, the storage subsystems 102 or disk devices 103 on the storage area network system are managed as resources by the management terminal 104. A single storage subsystem or a set of storage subsystems to be managed as a management unit is set as a storage management group 10. Unique specific names are assigned to such storage management groups 10 respectively. In this manner, a plurality of storage management groups 10 can be set on the storage area network system so that the resources do not overlap one another.

Next, disk devices 103 in each storage subsystem 102 belonging to each storage management group 10 are classified into sets of disk devices 103 by the purposes of use. Each set of disk devices 103 is set as a storage access definition group 11. Unique specific names are assigned to such storage access definition groups 11 respectively. Each of the storage access definition groups 11 can unify disk devices 103 contained in different storage subsystems 102.

Each storage subsystem 102 belonging to each storage management group 10 always contains either a storage control master device 12 or a storage control replica device 13 as a dedicated disk device for managing storage information.

The condition for deciding which of the storage control master device 12 and the storage control replica device 13 should be contained in the storage subsystem 102 is as follows. When a single storage subsystem 102 belongs to a certain storage management group 10, a dedicated disk device managing storage information possessed by the storage subsystem 102 is set as a storage control master device 12. When a plurality of storage subsystems 102 belong to a certain storage management group 10, one of the storage subsystems 102 has a storage control master device 12 and the other storage subsystem or subsystems 102 have a storage control replica device or storage control replica devices 13. In this case, synchronous processing is carried out between the master device and the replica device or each of the replica devices through fiber channels 105 connected to the storage subsystem 102 having the storage control master device 12 in one and the same storage management group 10, so that information stored in the master device is copied to or reflected in the replica device or each of the replica devices.

Further, when a plurality of storage subsystems belong to a certain storage management group, and one storage control master device is for one of the storage subsystems while one storage control replica device or a plurality of storage control replica devices are for the remaining storage subsystem or subsystems, the master and replica attributes of the storage control devices can be changed. If the storage control replica device or one of the storage control replica devices is designated as an attribute-changeable device, even in the condition that the storage control master device cannot be accessed due to failure or the like, the attribute of the storage control master device can be changed to an unusable replica device and, at the same time, the attribute of the designated storage control replica device can be changed to a master device to thereby make it possible to continue the access process.

In the attribute change process, when a storage control replica device allowing its attribute to be changed is designated in advance, the master and replica attributes may be switched over automatically in accordance with the condition of the storage control master device or may be switched over manually.

In this manner, when one control device (storage control master device 12 or storage control replica device 13) in every storage management group 10 is managed, the storage management group 10 can be managed as a whole.

In this embodiment, in order to manage and control the access route mapping from the servers 100 to the disk devices 103 controlled by the storage management groups 10 and the storage access definition groups 11, WWNs (World Wide Names) which are unique addresses assigned to the connection ports 102a on the fiber channels 105 are used for the servers 100 (connection ports 100a), the fiber channel switches 101 (connection ports 101a) and the storage subsystems 102 (connection ports 102a) respectively.

A device mapping table 300 and a sever security table 400 are stored in a registration information format shown in FIG. 3 in each of the storage control master devices 12 and the storage control replica devices 13 so that the storage information or the like is unitarily managed with the registration of WWNs of the connection ports 100a of the servers 100 and so on.

That is, the device mapping table 300 is provided for setting the disk devices 103 belonging to the storage management groups 10 and the storage access definition groups 11. The device mapping table 300 has storage management group names 301, storage access definition group names 302, storage subsystem IDs 303 such as manufacturing serial numbers for uniquely identifying the storage subsystems 102, WWNs 304 of the connection ports 102a of the storage subsystems 102, and object logical unit (LU) numbers 305 indicating real disk devices 103.

The server security table 400 is provided for setting the storage management groups and the storage access definition groups allowed to be accessed by the servers 100. In the server security table 400, there are registered the storage management group 10 (storage management group name 401) and the storage access definition groups 11 (storage access definition group names 402) used by the servers 100, access-allowable servers 403 indicating names of the servers allowed to gain access to the groups 10 and 11, and connection port WWNs 404 of the connection ports 100a of the servers 100.

The setting and control of each storage subsystem 102 in the device mapping table 300 and the server security table 400 as described above are carried out by the storage subsystem management terminal 104 through the network 200.

Further, the fiber channel switches 101 detect absence/presence of the storage control master devices 12 and the storage control replica devices 13 on ports 102a connected to the fiber channel switches 101. The fiber channel switches 101 read disk data directly from the existing storage control master devices 12 and storage control replica devices 13 and converts the read disk data into route mapping information such as an access route mapping table 600 attaching importance to access to the disk devices 103 as shown in FIG. 4. The fiber channel switches 101 manages the route mapping information on their own storage areas.

Figure 5:
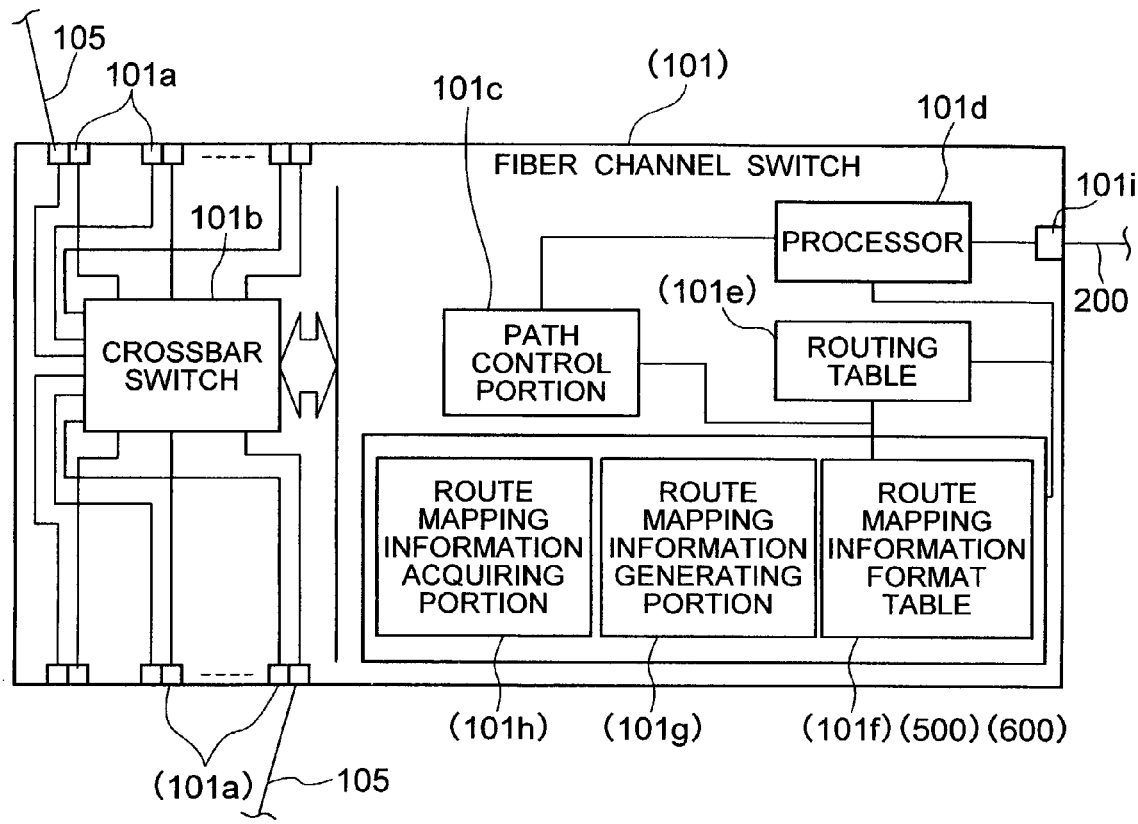
FIG. 5 is a conceptual view showing an example of the configuration of the fiber channel switch constituting the storage area network system according to the embodiment of the invention.

FIG. 5 is a conceptual diagram showing an example of the configuration of a fiber channel switch 101 according to this embodiment.

The fiber channel switch 101 according to the embodiment includes a plurality of connection ports 101a, a crossbar switch 101b, a path control portion 101c, a processor 101d, and a network interface 101i. The plurality of connection ports 101a are connected to servers 100, storage subsystems 102 and other fiber channel switches 101 through the fiber channels 105. The crossbar switch 101b controls connection routes between the servers 100 and the storage subsystems 102 by performing selective connection between the connection ports 101a. The pass control portion 101c controls the operation of the crossbar switch 101b on the basis of information such as a routing table 101e and a route mapping information format table 101f which will be described later. The processor 101d controls the whole of the switch 101. The network interface 101i is connected to the network 200 such as an LAN.

The fiber channel switch 101 further includes a route mapping information acquiring portion 101h, and a route mapping information generating portion 101g. The route mapping information acquiring portion 101h recognizes the storage control master device 12 or the storage control replica device 13 and acquires information such as the device mapping table or the server security table from the device. The route mapping information generating portion 101h converts the information acquired from the storage control master device 12 or the storage control replica device 13 into information such as an access route mapping table which will be described later.

The path control portion 101c, the route mapping information acquiring portion 101h, and the route mapping information generating portion 101g may be mounted, for example, as software executed by the processor 101d or as hardware.

FIG. 4 shows an example of information stored in the route mapping information format table 101f in the fiber channel switch 101.

In this embodiment, a storage control device table 500 for indicating positions, on the fiber channels, of the storage control master devices 12 or the storage control replica devices 13, and an access route mapping table 600 are stored in the route mapping information format table 10f.

Information such as storage management group names 501, storage control device kinds 502, storage subsystem IDs 503, connection port WWNs 504, LU numbers 505, and access frequencies 506 is stored in the storage control device table 500.

The information from the storage management group names 501 to the LU numbers 505 is set by the storage subsystem management terminal 104 through the network 200.

The access route mapping table 600 contains server names 601, server connection port WWNs 602, storage subsystem IDs 603, subsystem connection port WWNs 604, storage management group names 605, storage access definition group names 606, and information 607 of access routes via other switches.

The information on the access route mapping table 600 is generated on the basis of the device mapping tables 300 and the server security tables 400 read from the storage control master devices 12 or the storage control replica devices 13.

FIG. 2 is a flow chart showing an example of operation of a control method according to the embodiment. The example of operation of the control method according to the embodiment will be described below with reference to the flow chart of FIG. 2 and so on.

As shown in FIG. 2, in step S1, a storage control master device 12 is defined in any one of storage subsystems 102 as management targets belonging to one storage management group 10 by the storage subsystem management terminal 104, and a series of information exemplified as the device mapping table 300 and the server security table 400 shown in FIG. 3 is stored in the storage control master device 12.

Next, as shown in FIG. 2, in step S2, the management terminal defines a storage control replica device 13 in each of the other storage subsystems 102 under the management of one and the same storage management group 10.

Then, as shown in FIG. 2, in step S3, the storage subsystems start a synchronous or copy process so that the contents of the setting information exemplified in FIG. 3 and stored in the storage control master device 12 are made coincident with contents of information stored in each of the storage control replica devices 13 in the storage subsystems 102 belonging to one and the same storage management group 10.

Then, as shown in FIG. 2, in steps S4 and S5, a fiber channel switch 101 detects absence/presence of the storage control master device 12 and the storage control replica devices 13 on ports connected to the switch 101 itself, and registers the existing storage control master device 12 and the existing storage control replica devices 13 in the storage control device table 500. At the same time, the fiber channel switch 101 reads data of the device mapping table 300 and the sever security table 400 from the existing storage control master device 12 and the existing storage control replica devices 13, converts the data into route mapping information as represented by the access route mapping table 600 shown in FIG. 4, and registers the converted route mapping information in the storage area of the fiber channel switch 101 itself.

Figure 6:
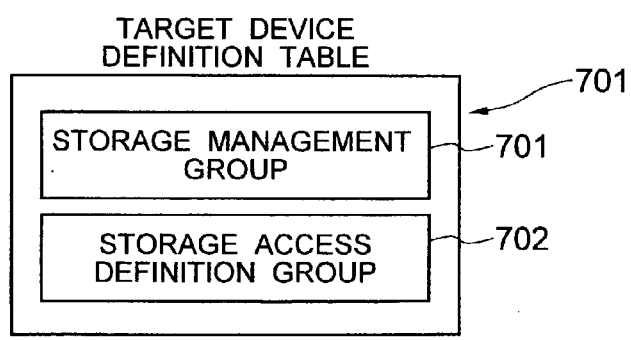
FIG. 6 is a conceptual view showing an example of a target device definition table set in each server accessing the storage area network system according to the embodiment of the invention.

On the other hand, as shown in FIG. 2, in step S6, each of the servers 100 defines the name of a storage management group 10 (storage management group 701) and the name of a storage access definition group 11 (storage access definition group 702) that the server 100 intends to use, as a target device definition table 700 shown in FIG. 6, in a storage device contained in the server.

The information stored in the target device definition table is only information for logical allocation. Accordingly, even if there is a hardware change in the system such as increase or decrease in number of disk devices in an SAN environment, or change in disk layout, the server can carry out access processing on the basis of the target device definition table without consciousness of the contents of the change.

In boot processing, when the server 100 intends to recognize disk devices (step S7 in FIG. 2), the server 100 requests access to any one of the storage control master device 12 and storage control replica devices 13 by issuing a command having, as parameters, information such as the name of the storage management group 10 (storage management group name 701) and the WWN of the connection port 100a of the server 100 itself which are registered in the target device definition table 700 of the server 100.

As shown in FIG. 2, in step S8, when only a single storage subsystem 102 belongs to the target storage management group 10, the fiber channel switch 101 selects a route to the storage control master device 12 of the subsystem and relays the access request to the storage subsystem 102. On the other hand, when a plurality of storage subsystems 102 belong to the target storage management group 10, the fiber channel switch 101 selects a route to a storage control device lowest in access frequency from the storage control master device 12 and storage control replica devices 13, and relays the access request to the selected storage subsystem 102. On this occasion, the fiber channel switch 101 carries out security control dynamically in accordance with the WWN (server connection port WWN 602) (of the connection port 100a) of the server 100 to thereby limit the access so that access to any other route than the required route can be forbidden.

As shown in FIG. 2, in step S9, upon reception of the access request (command) from the server 100, the storage subsystem 102 judges, from information (command parameters) attached to the access request and information managed by the storage subsystem 102, whether access to any one of the storage control master device 12 and storage control replica devices 13 by the server 100 is allowed or not. If the storage subsystem 102 decides that the access is allowed, the storage subsystem 102 makes the server 100 recognize only any one of the storage control master device 12 and the storage control replica devices 13. On the other hand, if the storage subsystem 102 decides that the access is not allowed, the storage subsystem 102 gives notification of the result to the server 100 and stops disk access processing so that processing after that is not carried out. On this occasion, the storage subsystem 102 carries out security control dynamically in accordance with the WWN of the server 100 to thereby limit access to any other disk device 103 than the selected one of the storage control master device 12 and the storage control replica devices 13.

As shown in FIG. 2, in step S10, if the server 100 can recognize the selected one of the storage control master device 12 and storage control replica devices 13, the server 100 checks disk devices 103 in the storage access definition group 11 to be actually accessed, and issues an access request.

As shown in FIG. 2, in step S11, the fiber channel switch 101 selects a route from the route mapping information, carries out security control dynamically in accordance with the WWNs of the servers 100 (server connection port WWNs 602) to validate only the route required for access, in other words, without any necessity of re-setting the environmental condition while suspending the operation of the server in response to the change of the disk devices to be connected, and relays the access request to the storage subsystem 102.

As shown in FIG. 2, in step S12, upon reception of the access request from the server 100, the storage subsystem 102 judges, from information attached to the access request and information managed by the storage subsystem 102, whether access to the target disk devices 103 of the storage access definition group 11 requested by the server is allowed or not. If the storage subsystem 102 decides that the access is allowed, the storage subsystem 102 makes the server 100 recognize the target disk devices 103. If the storage subsystem 102 decides that the access is not allowed, the storage subsystem 102 gives notification of the result to the server and stops the disk access processing so that the processing after that is not carries out. In response to access to the target disk devices 103, the storage subsystem 102 carries out security control dynamically in accordance with the WWNs of the servers 100 (server connection port WWNs 404) to thereby limit access. In the above-mentioned processing, preparation for executing access to disk data through the route validated for the access by an application program is completed (not shown).

In the setting example shown in FIG. 3, the "Server1" named "aaaaaaaaaaaaaa" as the WWN of its connection port 100a selectively recognizes disk devices 103 of LU numbers 01, 02 and 03 in the storage subsystem ID="001" allocated as the storage access definition group name "database" in the storage management group name "group01", and starts to use input/output access or the like.

Figure 7:
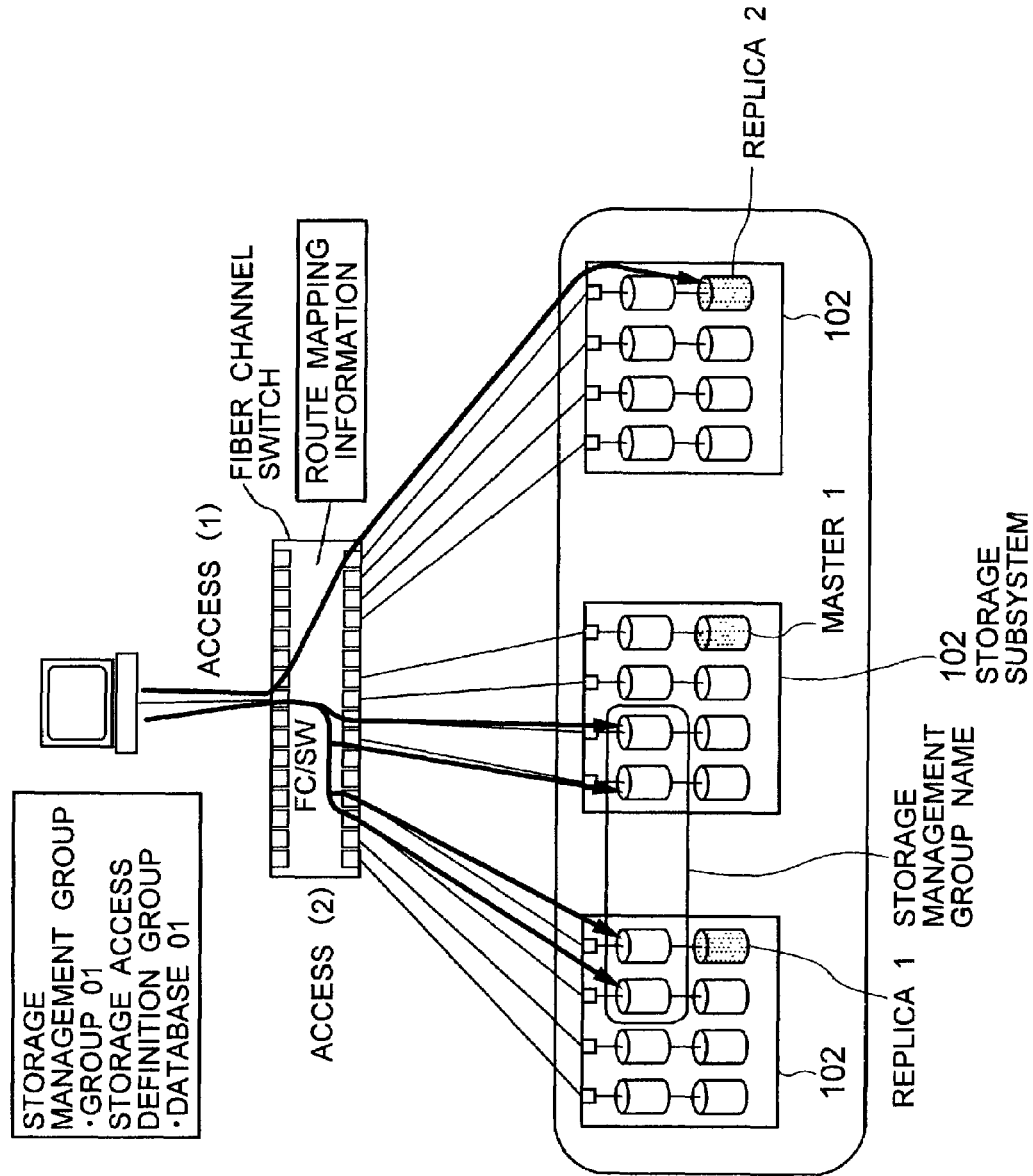
FIG. 7 is a conceptual view showing a storage area network system in which the control method according to the embodiment of the invention is carried out.

A more specific example of the operation will be shown in FIG. 7. In this example, three storage subsystems belong to a storage management group "Group01". That is, the storage management group "Group01" contains one storage control master device and two storage control replica devices. A storage access definition group "database01" is assigned to the storage management group "Group01". A fiber channel switch collects information from the storage control master device and the storage control replica devices, and has route mapping information. When a server is started in such an environment, the server, first, requests access in accordance with the stored storage management group information possessed by the server. On this occasion, the fiber channel switch validates only an access route to a storage control device lowest in access frequency, selected from the storage control master and replica devices on the basis of the storage management group information possessed by the server and the route mapping information possessed by the switch itself. In this example, the fiber channel switch decides that the replica device 2 is lowest in access frequency, and the fiber channel switch validates only the route to the replica device 2. Further, the storage subsystem validates only the target replica device 2 on the basis of its security function so that the other devices on one and the same path do not appear. In this manner, the server recognizes only the target replica device 2 and reads the control management information managed by the replica device 2. The server recognizes disk devices to be actually accessed on the basis of the information acquired from the storage access definition group "database01" stored in the server itself and the replica device 2, and requests access in accordance with the information. On this occasion, the fiber channel switch determines an access route on the basis of the information possessed by the server and the route mapping information possessed by the fiber channel switch itself, and validates only the route. Further, the storage subsystem validates only access to disk devices belonging to the storage access definition group "database01" by its own security function. In this manner, the server can gain access only to the disk devices belonging to the storage access definition group "database01".

As described above, according to the embodiment, in the storage area network system, any one of storage control master device 12 and storage control replica devices 13 is provided in each of storage subsystems 102, and information concerning disk devices 103 belonging to each of storage management groups 10 and storage access definition groups 11 is stored in association with information concerning WWNs of servers 100 in advance. When a server 100 is to recognize disk devices 103, the server 100 is, first, made to gain selective access to one of the storage control master device 12 and storage control replica devices 13. Hence, information concerning disk devices 103 belonging to the storage management group 10 and storage access definition group 11 in association with the server 100 is read from the accessed one of the storage control master device 12 and storage control replica devices 13 so that the disk devices 103 are selectively recognized by the server 100. As a result, reduction of the time required for recognition of devices such as physical disks, logical disks and logical volumes and avoidance of starting failure caused by recognition of a large number of unnecessary devices can be achieved at the time of starting of each server 100.

Further, because one of disk devices 103 in each of storage subsystems 102 is used as the storage control master device 12 or storage control replica device 13 in which setting information concerning the storage management group 10 and the storage access definition group 11 is stored, management information can be shared in a system closed in a storage area network environment without use of the storage subsystem management terminal 104 and another network 200. As a result, both improvement in efficiency of access to management information and improvement in security can be expected.

Although the present invention achieved by the present inventor has been described specifically in connection with the embodiment thereof, it is a matter of course that the present invention is not limited to this embodiment, and that various modifications may be made without departing from the gist of the invention.

What is claimed is:

1. A switch connected between a plurality of server nodes and a plurality of storage subsystems, said switch comprising:

first connection ports configured for being connected to connection ports of said plurality of server nodes;

second connection ports configured for being connected to connection ports of said plurality of storage subsystems;

a storage management table indicating storage subsystems accessible by each server node respectively, said storage subsystems being accessed according to a storage management group and a storage access definition group, wherein at least one storage management group includes two or more storage subsystems and at least one storage access definition group includes constituent disk devices from two or more storage subsystems, and wherein said storage management table is created on the basis of route mapping information input from a management terminal through said second connection ports;

an access route mapping table indicating connection routes from said server nodes to their correspondingly accessible storage subsystems as indicated by said storage management table, wherein said server nodes access said storage subsystems according to said connection routes; and a crossbar for switching connection between said first connection ports and said second connection ports in accordance with information contained in said storage management table and said access route mapping table.

2. A switch according to claim 1, wherein some of said storage management groups comprise a first storage subsystem with a master device and one or more additional storage subsystems with replica devices, the replica devices being synchronized to the master device.

3. A switch according to claim 2, further comprising a processor by which, when contents stored in said master device are changed, said changed contents are reflected in each of said replica devices.

4. A switch according to claim 2, wherein when a connection route to a storage subsystem corresponding to any one of said server nodes is changed, contents of said storage management table and contents of said access route mapping table are dynamically changed in accordance with the change of said connection route to thereby make it possible to continue access between said one of said server nodes and said storage subsystem without interruption.

5. A switch according to claim 2, wherein when any one of said server nodes is activated, contents of said storage management table and contents of said access route mapping table are dynamically changed to thereby make it possible to continue access between said server nodes and said storage subsystems without interruption.

6. A switch according to claim 2, wherein said access route mapping table further includes information for each storage management group identifying the master storage device in the first storage subsystem and the replica storage device in each additional storage subsystem.

7. A switch according to claim 6, further comprising a processor by which, when contents stored in said master device are changed, said changed contents are reflected in each of said replica devices.

8. A switch according to claim 1, wherein management information of said connection routes from said server nodes to said storage subsystems is received from one of said storage subsystems to thereby dynamically and selectively switch connection between said first connection ports and said second connection ports.

* * * * *